United States Patent
Kato et al.

(10) Patent No.: US 8,436,129 B2
(45) Date of Patent: May 7, 2013

(54) POLYCARBONATE RESIN HAVING ULTRAVIOLET ABSORBING CAPABILITY, RESIN COMPOSITION AND OPTICAL MATERIAL

(75) Inventors: Noriyuki Kato, Tokyo (JP); Shu Yoshida, Tokyo (JP); Toshiaki Yamada, Tokyo (JP); Jun Hagiwara, Tokyo (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 114 days.

(21) Appl. No.: 12/990,125

(22) PCT Filed: Apr. 23, 2009

(86) PCT No.: PCT/JP2009/001853
§ 371 (c)(1),
(2), (4) Date: Jan. 10, 2011

(87) PCT Pub. No.: WO2009/133672
PCT Pub. Date: Nov. 5, 2009

(65) Prior Publication Data
US 2011/0112271 A1    May 12, 2011

(30) Foreign Application Priority Data
Apr. 28, 2008 (JP) .................. 2008-117388

(51) Int. Cl.
*C08G 64/06* (2006.01)

(52) U.S. Cl.
USPC ........... 528/201; 528/193; 528/194; 528/196; 528/202; 528/204

(58) Field of Classification Search .......... 528/193, 528/194, 196, 201, 202, 204
See application file for complete search history.

(56) References Cited

U.S. PATENT DOCUMENTS

| | | |
|---|---|---|
| 2002/0082380 A1 | 6/2002 | Morioka |
| 2006/0199940 A1* | 9/2006 | Kim et al. ............ 528/198 |

FOREIGN PATENT DOCUMENTS

| | | |
|---|---|---|
| JP | 57-45259 B2 | 9/1982 |
| JP | 60-179420 A | 9/1985 |
| JP | 5-9287 A | 1/1993 |
| JP | 3017468 B2 | 12/1999 |
| JP | 2004-149746 A | 5/2004 |

OTHER PUBLICATIONS

International Preliminary Report on Patentability of Chapter (International Search Opinion) received WIPO as the International Bureau of the PCT (Forms PCT/ISA/237, PCT/IB/326, PCT/IB/338 and PCT/IB/373.
International Search Report dated Jun. 16, 2009 in International Application No. PCT/JP2009/001853.
Extended European Search Report dated Dec. 13, 2012, for European Patent Application No. 09738609.

* cited by examiner

*Primary Examiner* — Gregory Listvoyb
(74) *Attorney, Agent, or Firm* — Birch, Stewart, Kolasch & Birch, LLP

(57) ABSTRACT

A polycarbonate resin having at least one terminal group which is represented by formula (1), and a resin composition and an optical material comprising the polycarbonate resin are disclosed. In the formula, $R^1$-$R^9$ each independently represent a hydrogen atom, halogen atom or an alkyl group. $X^1$ represents a direct bond or alkylene group.

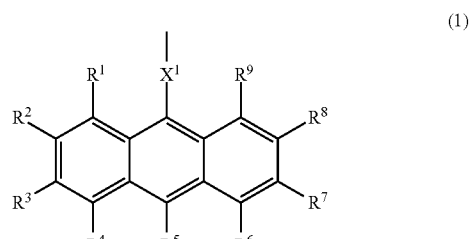

(1)

7 Claims, No Drawings

POLYCARBONATE RESIN HAVING ULTRAVIOLET ABSORBING CAPABILITY, RESIN COMPOSITION AND OPTICAL MATERIAL

TECHNICAL FIELD

The present invention relates to a polycarbonate resin having ultraviolet absorbing capability, and a resin composition and optical material containing the same. More specifically, the present invention relates to low-volatile and ultraviolet absorptivity polycarbonate resin, and a resin composition and optical material capable of filtering out UV rays of 400 nm or shorter by being added with the resin.

BACKGROUND ART

UV cutting filters for cameras are what try to block UV rays without influencing visible light or color properties of lenses at all. Accordingly, they are required to have light transmission characteristics changing drastically (sharply-cutting characteristics) in the boundary region between visible light and UV rays. And they are required also to have flat light transmission characteristics for visible light and to have excellent color rendering properties.

As a glass capable of absorbing and/or blocking UV rays, a glass containing cerium oxide is known (Patent Document 1). Cerium oxide has a strong absorption at about 310 nm, however, for obtaining a glass capable of absorbing the light of 350 nm or longer, a large amount of cerium oxide may be needed. A glass containing cerium oxide in a large amount may absorb visible light and may be colored in yellow or brown. Such a glass may block not only UV rays but also visible light, and is inferior in terms of properties of selectively-blocking-UV rays.

Therefore, plastic materials have been considered to be used in place of such a glass. For blocking UV rays by plastic materials, the method of adding any organic ultraviolet absorber such as benzotriazole-series, benzophenone-series and salicylic acid-series compounds to plastic materials is known (see Patent Document 2). However, many of thermoplastic resins added with any low-molecular ultraviolet absorber may suffer from volatilization and the mold-deposit problem when they are subjected to a forming process at a high temperature.

There is another problem that conventional UV-cut materials suffer from lacking sharpness of changing the light transmission characteristics in the boundary region between visible light and UV rays. And the thickness of the conventional UV-cut filter lens is not so thin that it doesn't have sufficient transmission for the visible light, sufficient flat light transmission characteristics for visible light, and excellent color rendering properties.

As a method for improving fluidity, adding a dihydroanthracene compound to polycarbonate resins is known (Patent Document 3). However, any optical properties such as absorbance distribution are not described. Although polycarbonate resins having an anthracene skeleton in the main chain are proposed (Patent Document 4), they are poor in terms of light resistance, and can not be used as an optical material.

PRIOR ART DOCUMENTS

Patent Documents

[Patent Document 1] Japanese Patent No. 3017468
[Patent Document 2] JP-B-57-45259
[Patent Document 3] JP-A-2004-149746
[Patent Document 4] JP-A-60-179420

DISCLOSURE OF THE INVENTION

Problems to be Resolved by the Invention

An object of the present invention is to provide a polycarbonate resin, resin composition and optical material which can filter out UV rays of 400 nm or longer and are excellent in color rendering properties, and are useful as a UV-cutting material.

Means of Solving the Problems

Under the above circumstances, the present inventors conducted various studies for providing UV-cutting materials having sharpness of cutting ability for UV rays by a lower content, and as a result, they made the present invention. That is, the present invention relates to a polycarbonate resin having at least one terminal group which is represented by formula (1).

[Chemical Formula 1]

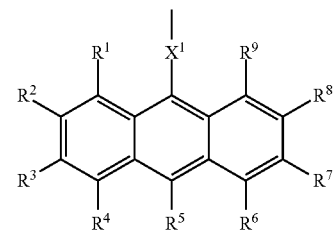

(1)

(In the formula, $R^1$-$R^9$ each independently represent a hydrogen atom, halogen atom or an alkyl group. $X^1$ represents a direct bond or alkylene group.)

Effect of the Invention

The polycarbonate resin of the invention has UV absorption ability, and the resin composition and optical material containing it shows UV-cutting ability when being irradiated with UV rays. The polycarbonate resin of the invention, and the resin composition and optical material employing it are useful in various applications, depending on their formulations. They are useful in various applications such as not only UV-cutting filters for cameras but also solar energy collectors, polymer coatings, transparent plastic films, fluorescent scattering apparatus, package materials, coatings for vinyl windows, automobile coatings, coatings for interior accessories, epoxys and glass-fiber structures.

MODE FOR CARRYING OUT THE INVENTION

The present invention relates to a polycarbonate resin having at least one terminal group which is represented by formula (1) below.

[Chemical Formula 2]

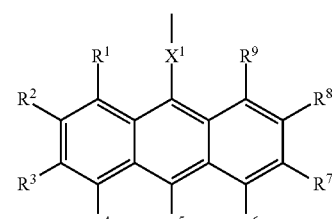

(1)

In the formula, $R^1$-$R^9$ each independently represent a hydrogen atom, halogen atom or an alkyl group. $X^1$ represents a direct bond or alkylene group.

Examples of the halogen atom represented by each of $R^1$-$R^9$ include chlorine and bromine atoms. The alkyl group represented by each of $R^1$-$R^9$ is preferably a $C_1$-$C_4$ alkyl group. $X^1$ is preferably a direct bond (single bond) or a $C_1$-$C_4$ alkylene group.

Preferable examples of the polycarbonate resin of the invention include polycarbonate resins having the terminal group in which all of $R^1$-$R^9$ are hydrogen atoms and $X^1$ is a methylene.

The polycarbonate resin of the invention may be prepared by reacting anthracene monool in transesterification of bisphenol(s) or diol(s) and bisarylcarbonate(s).

In the above-described method, phosgene or bis-aryl carbonate such as diphenyl carbonate, di-p-tolyl carbonate, phenyl-p-tolyl carbonate, di-p-chlorophenyl carbonate and di-naphthyl carbonate may be used as a compound capable of forming a carbonate ester. These compounds may be used singly or in combination of two or more thereof.

In the above-described method, bisphenol(s) and bis-aryl carbonate(s) are mixed and then reacted under reduced pressure at a high temperature. The reaction temperature is usually from 150 to 350 degrees Celsius, preferably from 200 to 300 degrees Celsius; and the degree of reduced pressure is preferably equal to or less than 133 Pa at the end of reaction, so that phenols derived from bis-aryl(s) formed by transesterification are distilled away from the reaction system. The reaction period may depend on the reaction temperature and the degree of reduced pressure, and usually from 1 to 4 hours. The reaction is preferably carried out under the atmosphere of inert gas such as nitrogen or argon gas. Branching may be generated during the reaction. If desired, the reaction may be carried out under addition of agent for controlling molecular weight, antioxidant or branching agent.

In the above-described method, any basic compound catalyst is used. Examples of the basic compound catalyst to be used include alkali metal compounds and/or alkali earth metal compounds and nitrogen-containing compounds. Among these, organic acid salts, inorganic acid salts, oxides, hydroxides, hydrides and alkoxides of alkali metal compounds and alkali earth metal compounds; quaternary ammonium hydroxides and salts thereof; and amines; are preferable. And such compounds may be used singly or in combination of two or more thereof. Such a catalyst is usually used in an amount of from $10^{-9}$ to $10^{-3}$ moles relative to 1 mole of all of hydroxy compound(s), preferably in an amount of from $10^{-7}$ to $10^{-4}$ moles.

Examples of anthracene monool, which can be used in the above-described reaction, include 9-(hydroxymethyl)anthracene, 2-chloro-9-(hydroxymethyl)anthracene, 10-bromo-9-(hydroxymethyl)anthracene, 9-hydroxymethyl-1-methylanthracene, 9-hydroxymethyl-2-methylanthracene, 2-ethyl-9-hydroxymethyl anthracene and 9-hydroxyanthracene. Especially, 9-(hydroxymethyl)anthracene (also known as 9-anthracene methanol) is preferable.

In the above-described reaction, anthracene monool can be used in an amount of from 0.001% by mole to 0.495% by mole relative to the total moles of diol compound(s) and bisphenol(s), that is, monomers of the polymerization. Preferably, anthracene monool can be used in an amount of from 0.005% by mole to 0.40% by mole. More preferably, anthracene monool can be used in an amount of from 0.025% by mole to 0.25% by mole.

Specific examples of the bisphenol compound(s), which can be used for preparing the polycarbonate resin of the invention, include 9,9-bis(4-hydroxyphenyl)fluorene, 9,9-bis(3-methyl-4-hydroxyphenyl)fluorene, bis(4-hydroxyphenyl) methane, 1,1-bis(4-hydroxyphenyl)ethane, 2,2-bis(4-hydroxyphenyl)propane, 2,2-bis(4-hydroxyphenyl) hexafluoropropane, 2,2-bis(3-methyl-4-hydroxyphenyl) propane, 1,1-bis(4-hydroxyphenyl)-1-phenylethane, 1,1-bis (4-hydroxyphenyl)cyclohexane, 1,1-bis(4-hydroxyphenyl)-3,3,5-trimethylcyclohexane, α,α'-bis(4-hydroxyphenyl)-α, α,α',α'-tetramethyl-m-xylene, and α,α'-bis(4-hydroxyphenyl)-α,α,α',α'-tetramethyl-p-xylene.

Specific examples of the hydroxy compound(s), which can be used for preparing the polycarbonate resin of the invention, include tricyclo[5.2.1.0$^{2,6}$]decane dimethanol, cyclohexane-1,4-dimethanol, decalin-2,6-dimethanol, norbornane dimethanol, pentacyclo pentadecane dimethanol, cyclopentane-1,3-dimethanol, 1,4-butanediol, 1,5-pentanediol, 1,6-hexanediol, 1,9-nonanediols, pentacyclo[6.5.1.1$^{3,6}$.0$^{2,7}$.0$^{9,13}$]pentadecane dimethanol, pentacyclo[9.2.1.1$^{4,7}$.0$^{2,10}$.0$^{3,8}$] pentadecane dimethanol, decalin dimethanol, cyclohexane dimethanol, 3,9-bis(1,1-dimethyl-2-hydroxyethyl)-2,4,8,10-tetraoxa spiro[5.5]undecane, isosorbit, 9,9-bis(4-(2-hydroxyethoxy)phenyl)fluorene, 9,9-bis(4-(2-hydroxyethoxy)-3-methylphenyl)fluorene, 9,9-bis(4-(2-hydroxyethoxy)-3,5-dimethylphenyl)fluorene, 9,9-bis(4-(2-hydroxyethoxy)-3-tert-butylphenyl)fluorene, 9,9-bis(4-(2-hydroxyethoxy)-3-isopropylphenyl)fluorene, 9,9-bis(4-(2-hydroxyethoxy)-3-cyclohexyl phenyl)fluorene, and 9,9-bis(4-(2-hydroxyethoxy)-3-phenylphenyl)fluorene.

The glass-transition temperature of the polycarbonate resin of the invention is preferably from 95 to 165 degrees Celsius, more preferably from 105 to 165 degrees Celsius. If the glass-transition temperature is lower than 95 degrees Celsius, heat resistance of the resin may lower, and the usage environment of the resin may be restricted, which is not preferable. If the glass-transition temperature is higher than 165 degrees Celsius, the fluidity of the resin may lower, and the conditions in forming may become strict, which is not preferable. Or if the molecular weight is lowered for achieving the sufficient fluidity, the resin may be brittle, which is not preferable.

The polystyrene-converted weight average molecular weight of the polycarbonate resin of the invention is preferably from 20,000 to 200,000, more preferably from 35,000 to 100,000. When the polystyrene-converted weight average molecular weight is lower than 20,000, it is not preferable since the mechanical strength lowers. When it is more than 200,000, it is not preferable since flow ability deteriorates and molding conditions become strict.

Minimizing an amount of the foreign substance contained in the polycarbonate of the invention is desirable; and therefore, filtration of the melt material or the catalyst solution is preferably carried out. The mesh of the filter to be used for filtering is preferably from 0.01 to 5 μm, more preferably from 0.1 to 1 μm. Furthermore, the obtained polycarbonate is preferably subjected to filtration with a polymer filter. The mesh of the polymer filter is preferably from 0.5 to 100 μm, more preferably from 1 to 30 μm. Naturally, the step for collecting resin pellets is carried out in the environment with low-dust. Therefore, the step is preferably carried out in a Class 1000 or less environment, more preferably carried out in a Class 100 or less environment. It is to be noted that Class X environment means an environment in which there are X-numbers of particles, having a particle size of 0.5 μm or larger, in 1 cubic feet.

The polycarbonate of the invention is preferably subjected to a treatment for removing or inactivating the catalyst in terms of thermostability and hydrolytic stability. Usually, neutralizing the transesterification-catalyst such as alkali metal compounds and alkali earth metal compounds bi addition of any known acidic substance(s) is preferably carried out. Specific examples of such a compound include phosphorous-containing acid compounds such as phosphoric acid, phosphorous acid, hypophosphorous acid, phenylphosphate, phenylphosphine, phenylphosphinic acid, phenylphosphonic acid, diphenyl phosphate, diphenyl phosphite, diphenyl phosphine, diphenyl phosphine oxide, diphenylphosphinic acid, monomethyl acid phosphate, monomethyl acid phosphite, dimethyl acid phosphate, dimethyl acid phosphite, monobutyl acid phosphate, monobutyl acid phosphite, dibutyl acid phosphate, dibutyl acid phosphite, monostearyl acid phosphate and distearyl acid phosphate; and aromatic sulfonic acid compounds such as p-toluene sulfonic acid, methyl p-toluenesulfonate, ethyl p-toluenesulfonate, propyl p-toluenesulfonate, butyl p-toluenesulfonate, pentyl p-toluenesulfonate, hexyl p-toluenesulfonate, octyl p-toluenesulfonate, phenyl p-toluenesulfonate, phenethyl p-toluenesulfonate and naphthyl p-toluenesulfonate.

An amount of the phosphorous-containing acid compound(s) or aromatic sulfonic acid compound(s) to be added is preferably from ⅕ to 20 times, more preferably from ½ to 10 times, of the equivalent amount for neutralization of the basic compound catalyst such as any alkali metal compound(s) and/or any alkali earth metal compound(s). If the amount is less than the range, the effect cannot be obtained; and if it is excess, it is not appropriate since the heat-resistant property and the mechanical property are lowered.

Any aromatic sulfonic phosphonium salt(s) is also preferably used as an agent for inactivating the catalyst. Examples of the aromatic sulfonic phosphonium salt include benzene sulfonic acid tetrabutylphosphonium salt, p-toluene sulfonic acid tetrabutylphosphonium salt, butylbenzene sulfonic acid tetrabutylphosphonium salt, octylbenzene sulfonic acid tetrabutylphosphonium salt, dodecylbenzene sulfonic acid tetrabutylphosphonium salt, dodecylbenzene sulfonic acid tetramethylphosphonium salt, dodecylbenzene sulfonic acid tetraethylphosphonium salt and dodecylbenzene sulfonic acid tetrahexylphosphonium salt.

An amount of the aromatic sulfonic phosphonium salt(s) to be added is usually from 1 to 300 ppm, preferably from 10 to 100 ppm, relative to an amount of the polycarbonate resin. If the amount is less than the range, the effect cannot be obtained; and if it is excess, it is not appropriate since the heat-resistant property and the mechanical property are lowered.

The invention relates also to a resin composition containing the ultraviolet absorptivity polycarbonate of the invention. One embodiment of the resin composition of the invention is a resin composition containing the polycarbonate resin of the invention and at least one synthetic resin other than the polycarbonate resin of the invention. Other resin(s) to be used is not limited and may be selected from any known synthetic resins. Examples of the thermoplastic resin which can be used in the invention include polyvinyl chloride resins, polyvinylidene chloride resins, polyolefins, polycarbonates, polystyrenes, acrylic resins, methacrylic resins, polyamides, polyesters, ABS resins, thermoplastic polyurethanes, vinyl chloride-vinylidene chloride-acrylonitrile copolymers, acrylonitrile-styrene (AS) resins, vinyl acetate resins, polyphenylene ether resins, polysulfones, polyether sulfone resins, polyether ether ketone resins and liquid-crystal polymers. Among theses, polyvinyl chloride resins, polyvinylidene chloride resins, polyolefins, polycarbonates, polystyrenes, acrylic resins, methacrylic resins, polyamides, polyesters, ABS resins and thermoplastic polyurethanes are preferably used. More preferably, polycarbonates and polyesters are used in terms of compatibility. According to the invention, other synthetic resin may be used singly or in combination of two or more thereof.

The ratio of the polycarbonate resin of the invention in the composition is not limited, and may be selected from the various ranges. Usually, the ratio by weight is from 40:60 to 0.005:99.995, and preferably from 30:30 to 0.05:99.95.

The resin composition of the invention may contain any known additive(s) depending on its target, unless the properties of the ultraviolet absorptivity polycarbonate resin of the invention are lowered.

The resin composition of the invention preferably contains antioxidant(s). Examples of the antioxidant include phosphite compounds such as triphenyl phosphite, tris(4-methylphenyl)phosphite, tris(4-t-butylphenyl)phosphite, tris(monononyl phenyl)phosphite, tris(2-methyl-4-ethylphenyl)phosphite, tris(2-methyl-4-t-butylphenyl)phosphite, tris(2,4-di-t-butylphenyl)phosphite, tris(2,6-di-t-butylphenyl)phosphite, tris(2,4-di-t-butyl-5-methylphenyl)phosphite, tris(mono, dinonyl phenyl)phosphite, bis(mononyl phenyl)pentaerythritol-di-phosphite, bis(2,4-di-t-butylphenyl)pentaerythritol-di-phosphite, bis(2,6-di-t-butyl-4-methyl phenyl)pentaerythritol-di-phosphite, bis(2,4,6-tri-t-butylphenyl)pentaerythritol-di-phosphite, bis(2,4-di-t-butyl-5-methylphenyl)pentaerythritol-di-phosphite, 2,2-methylene bis(4,6-dimethylphenyl)octyl phosphite, 2,2-methylene bis(4-t-butyl-6-methylphenyl)octyl phosphite, 2,2-methylene bis(4,6-di-t-butylphenyl)octyl phosphite, 2,2-methylene bis(4,6-dimethylphenyl)hexyl phosphite, 2,2-ethylene bis(4,6-di-t-butylphenyl)hexyl phosphite and 2,2-methylene bis(4,6-di-t-butylphenyl)stearyl phosphite; hindered phenol-series compounds such as pentaerythrityl-tetrakis[3-(3,5-di-t-butyl-4-hydroxyphenyl)propionate], 1,6-hexane diol-bis[3-(3,5-di-t-butyl-4-hydroxyphenyl)propionate], octadecyl-3-(3,5-di-t-butyl-4-hydroxyphenyl)propionate, 1,3,5-trimethyl-2,4,6-tris(3,5-di-t-butyl-4-hydroxybenzyl)benzene, triethylene glycol-bis[3-(3-t-butyl-5-methyl-4-hydroxyphenyl)propionate], 3,9-bis{2-[3-(3-t-butyl-4-hydroxy-5-methylphenyl)propionyl oxy]-1,1-dimethylethyl}-2,4,8,10-tetraoxa spiro [5,5]undecane, and 1,1,3-tris[2-methyl-4-(3,5-di-t-butyl-4-hydroxyphenyl propionyl; and 5,7-di-t-butyl-3-(3,4-dimethylphenyl)-3H-benzofuran-2-on. These antioxidants may be used singly or in combination of two or more thereof.

An amount of the antioxidant to be added is preferably from 0.005 to 0.1% by weight, more preferably from 0.01 to 0.08% by weight, and even more preferably from 0.01 to 0.05% by weight with respect to 100% by weight of the polycarbonate of the invention. If the amount is less than the range, the effect cannot be obtained; and if it is excess, it is not appropriate since the heat-resistant property and the mechanical property are lowered.

Any usual release agents may be used, and examples of the agent include natural and synthetic paraffins, silicone oils, polyethylene waxes, bees waxes, stearic acid, stearic acid monoglyceride, stearyl stearate, palmitic acid monoglyceride, behenyl behenate, pentaerythritol distearate and pentaerythritol tetrastearate. These compounds may be used singly or in combination of two or more thereof.

Other additives such as fire-retardants, antistatic agents, pigments and dyes may be used singly or in combination thereof if desired.

These additives may be added according to any methods such as a method of adding the additive(s) to a molten resin after the end of polycondensation and a method of mixing and kneading the additive(s) with a re-molten resin after cooled-pelletization. The method of adding the additive(s) to a molten resin after the end of polycondensation is preferable because the thermal history can be reduced. Addition of the additive(s) may be carried out according to any methods such as a method of pouring the additive(s) into a polymerization vessel directly and a method of mixing and kneading additive(s) using a one-screw extruder, twin-screw extruder or the like. The embodiment of adding the additive(s) is not limited, and for example, it can be added as intact without dilution, can be diluted in a miscible solvent before addition or can be added in the form of a master batch. The time of adding the additive(s) is not also limited, and preferably, it is added on or after adding any inactivation agent(s) for the catalyst(s). In the embodiments employing an extruder and, especially, pure water or solvent as a devolatilization auxiliary for any low-molecular compound(s), the additive(s) is preferably added after a devolatilization treatment because some kinds of the additive(s) may be hydrolyzed or removed with the devolatilization auxiliary. And if the additive(s) exhibiting relatively-low thermostability is used, adding it at the possible terminal portion of the extruder is effective for reducing the thermal history.

EXAMPLES

The present invention will be illustrated in further detail with reference to several examples below, which are not intended to limit the scope of the present invention. The data of the following examples were measured according to the following methods and the following instruments.
1) Mold Injection Apparatus: "SH50" produced by Sumitomo Heavy Industries, Ltd was used.
2) Absorbance: The absorbance of each of the injection-molded plates (thickness: 3 mm) prepared in each of the following examples was measured by using a recording spectrometer, "U3500" manufactured by HITACHI.

Example 1

In a 50-liters reactor vessel equipped with a stirrer and a distillation instrument, 2.286 kg (10.01 moles) of 2,2-bis(4-hydroxyphenyl)propane, 9.893 kg (46.19 moles) of diphenyl carbonate, 0.02225 g ($2.650 \times 10^{-4}$ moles) of sodium hydrogen carbonate and 33.83 g (0.1620 moles) of 9-anthracenemethanol were placed, and heated and stirred under a nitrogen atmosphere of 101 kPa up to 215 degrees Celsius over one hour.

After that, the degree of the reduced pressure was adjusted to 20 kPa over 25 minutes, and transesterification of the mixture was carried out in the condition of 20 kPa and 215 degrees Celsius for 20 minutes. Furthermore, the temperature was increased up to 240 degrees Celsius at a rate of 37.5° C./hr, and the mixture was allowed to stand in the condition of 20 kPa and 240 degrees Celsius for 10 minutes. After that, the degree of the reduced pressure was adjusted to 16 kPa over 10 minutes, and the mixture was allowed to stand in the condition of 16 kPa and 240 degrees Celsius for 70 minutes. After that, the degree of the reduced pressure was adjusted to 13.3 kPa over 10 minutes, and the mixture was allowed to stand in the condition of 13.3 kPa and 240 degrees Celsius for 10 minutes. Furthermore, the degree of the reduced pressure was adjusted to 0.1 kPa or less over 40 minutes, and polymerization of the mixture was carried out under stirring in the condition of 0.1 kPa or less and 240 degrees Celsius for 10 minutes. After the end of reaction, the inside of the reactor vessel was pressurized by nitrogen gas, and the obtained polycarbonate was extracted therefrom while it was pelletized. The weight-averaged molecular weight (MW) of the obtained polycarbonate was 38,000, and the glass-transition temperature (Tg) was 142 degrees Celsius. 10.0 kg of the obtained polycarbonate was dried in vacuum at 100 degrees Celsius for 24 hours, added with 1.5 ppm of phosphorous acid, 50 ppm of diphenyl phosphite, 500 ppm of "ADK STAB PEP-36" (manufacture by ADEKA CORPORATION), 200 ppm of "IRGANOX1010" (manufactured by Ciba Geigy Co., Ltd.) and 300 ppm of glycerin monostearate, mixed and kneaded with them by using an extruder (an IPT-type 35 mm-same-directed-twin-screw extruder manufactured by IPEC CORPORATION) at 260 degrees Celsius, and then pelletized. In this way, pellets were obtained. The Mw of the pellet was 42,100.

Being dried in vacuum at 100 degrees Celsius for 5 hours, the pellet was subjected to an injection molding at a cylinder temperature of 250 degrees Celsius and a mold temperature of 100 degrees Celsius to give a clear and colorless injection-molded plate having a diameter of 70 mm and a thickness of 3.0 mm. The absorbance of the sample plate was measured and it was found that the sample plate blocked UV rays of 400 nm or shorter. The same material was subjected to an injection molding 300 shots continuously, and it was found that any mold-deposit didn't occur on the mold.

Example 2

20 Kg of a polycarbonate resin prepared by using bisphenol A as a material (Product name: "Iupilon H-4000" manufactured by Mitsubishi Engineering-Plastics Corporation) and 5.0 kg of the resin prepared in Example 1 were mixing and kneading by using an extruder (an IPT-type 35 mm-same-directed-twin-screw extruder manufactured by IPEC CORPORATION) at 255 degrees Celsius, and then pelletized. In this way, pellets were obtained.

An injection-molded plate was prepared in the same manner as Example 1, the absorbance thereof was measured, and it was found that the sample plate blocked UV rays of 400 nm or shorter. The same material was subjected to an injection molding 300 shots continuously, and it was found that any mold-deposit didn't occur on the mold.

Comparative Example 1

A polycarbonate resin prepared by using bisphenol A as a material (Product name: "Iupilon H-4000" manufactured by Mitsubishi Engineering-Plastics Corporation) was dried in vacuum at 100 degrees Celsius for 5 hours, and was subjected to an injection molding at a cylinder temperature of 250 degrees Celsius and a mold temperature of 100 degrees Celsius to give a clear and colorless injection-molded plate having a diameter of 70 mm and a thickness of 3.0 mm. The absorbance of the sample plate was measured and it was found that the sample plate didn't block UV rays of 400 nm or shorter completely (the transmittance at 400 nm was 87.0%).

Comparative Examples 2 and 3

As a ultraviolet absorber, 0.8 wt % (Comparative Example 2) and 2.0 wt % (Comparative Example 3) of 2,2'-dihydroxy-4,4'-dimethoxybenzophenone was added respectively to a polycarbonate resin prepared by using bisphenol A as a material (Product name: "Iupilon H-4000" manufactured by Mitsubishi Engineering-Plastics Corporation), sample plates having a thickness of 3 mm were prepared in the same manner as Example 1 respectively, and then the distributions of transmitted light were measured. The absorbance of the sample plates was measured and it was found that the sample plates blocked UV rays of 400 nm or shorter. However, it was also found that the samples easily took a yellow tinge.

Furthermore, the same materials of Comparative Examples 2 and 3 were subjected to an injection molding 300 shots continuously, and it was found that mold-deposit occurred on the molds used in Comparative Examples 2 and 3.

The invention claimed is:

1. A polycarbonate resin having at least one terminal group which is represented by formula (1) below

[Formula 1]

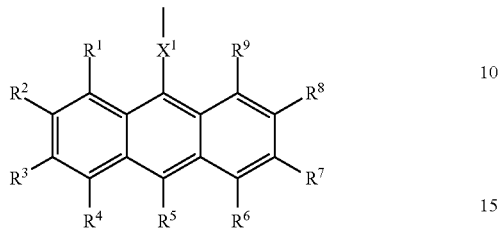

(1)

(In the formula, $R^1$-$R^9$ each independently represent a hydrogen atom, halogen atom or an alkyl group; $X^1$ represents a direct bond or alkylene group).

2. The polycarbonate resin of claim 1, comprising a structural unit derived from 2,2-bis(4-hydroxyphenyl)propane.

3. The polycarbonate resin of claim 1, wherein, in formula (1), $R^1$-$R^9$ are hydrogen atoms; and $X^1$ is a methylene.

4. The polycarbonate resin of claim 1, produced according to a transesterification method.

5. A resin composition comprising a polycarbonate resin of claim 1.

6. An optical material formed of a polycarbonate resin of claim 1.

7. An optical material formed of a resin composition of claim 5.

* * * * *